July 12, 1938.  E. L. WIEGAND  2,123,294
ELECTRIC HEATING APPARATUS
Filed Aug. 27, 1936  2 Sheets-Sheet 1
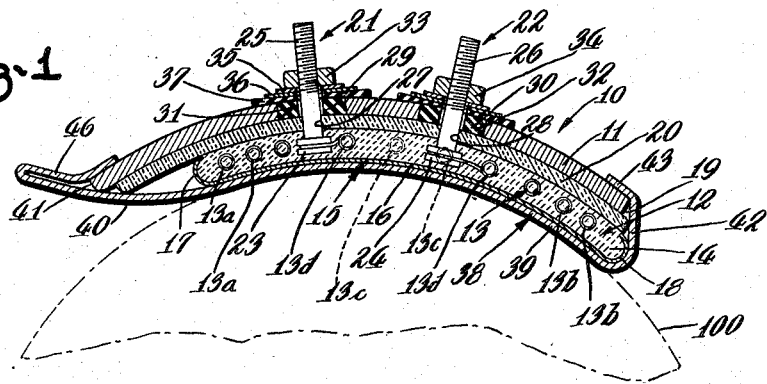
Edwin L. Wiegand
INVENTOR
By Freeman, Sweet, Albrecht, and Weidman
ATTORNEYS July 12, 1938.　　　　E. L. WIEGAND　　　　2,123,294
ELECTRIC HEATING APPARATUS
Filed Aug. 27, 1936　　　2 Sheets-Sheet 2
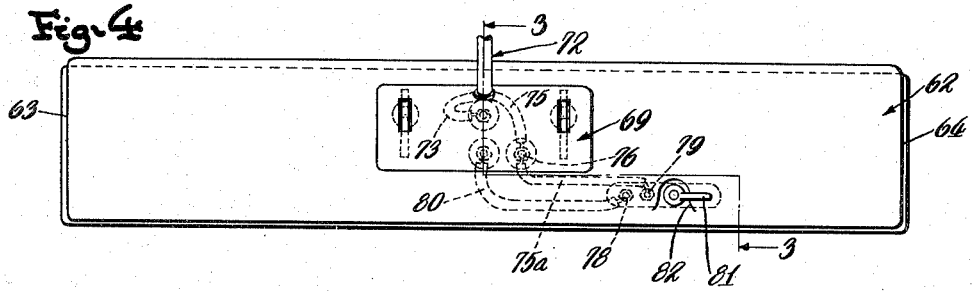
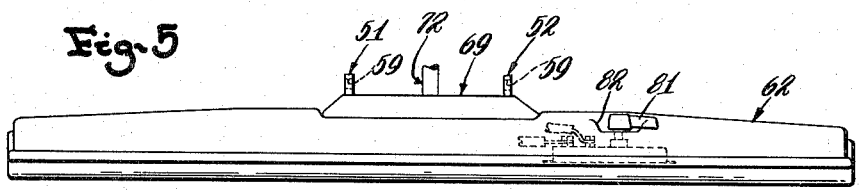
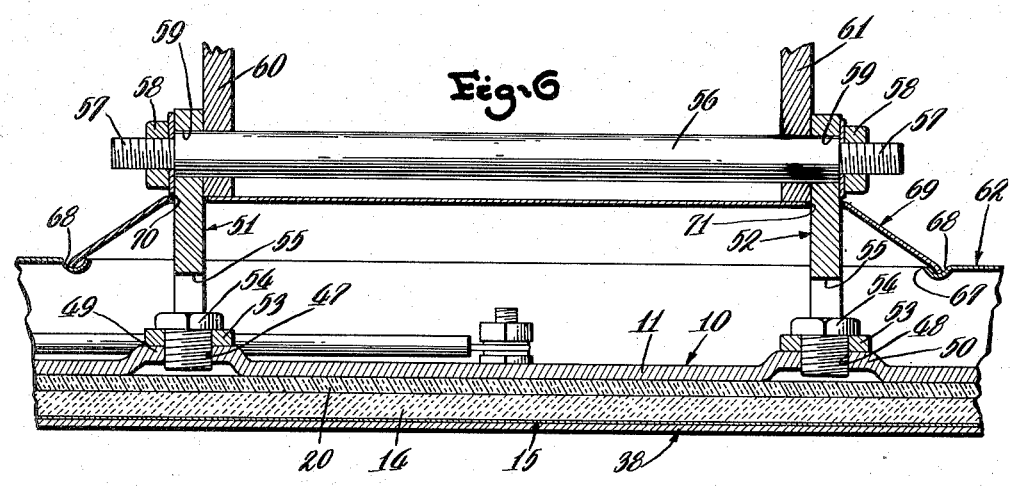
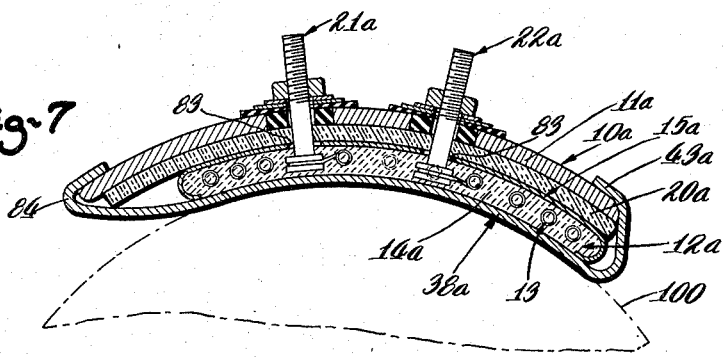
Edwin L. Wiegand
INVENTOR
BY Freeman, Swets, Albrecht and Weidman
ATTORNEYS Patented July 12, 1938

2,123,294

UNITED STATES PATENT OFFICE 2,123,294

ELECTRIC HEATING APPARATUS

Edwin L. Wiegand, Pittsburgh, Pa.

Application August 27, 1936, Serial No. 98,123

19 Claims. (Cl. 219—19)

My invention relates to electric heating apparatus, and more particularly to so-called "shoes" for applying heat and pressure to textiles and the like, as for example in ironing and pressing machines and similar apparatus, and the principal object of my invention is to provide new and improved constructions of these types. In the drawings accompanying this specification, and forming a part of this application, I have shown, for purposes of illustration, certain forms which my invention may assume. In these drawings:

Figure 1 is a cross-section, on the line 1—1 of Figure 2, of an ironing machine shoe unit, embodying my invention, certain accessory parts which may be provided, being omitted, Figure 2 is a plan view of the shoe unit shown in Figure 1, Figure 3 is a cross-section, on the line 3—3 of Figure 4, looking in the direction of the arrows, of an ironing machine shoe unit, such as shown in Figure 1, but with certain accessory parts included, Figure 4 is a plan view of the apparatus shown in Figure 3, a part of the supporting means of the shoe being omitted for the sake of clearness, Figure 5 is a side elevation of the apparatus shown in Figure 4, Figure 6 is a fragmentary sectional view taken on the line 6—6 of Figure 3, looking in the direction of the arrows, and Figure 7 is a cross-section of another embodiment of an ironing shoe unit, embodying my invention.

Referring more particularly to the embodiment of my invention shown in Figures 1 and 2, there is here shown an ironing machine shoe unit which includes a relatively heavy metallic backing plate 11, desirably but not necessarily made of rolled steel. The backing plate 11 is here shown as of oblong rectangular shape, when viewed in plan, and as bent to arcuate form in transverse cross-section, so that, as here shown, the outer and inner surfaces thereof define parts of concentric cylindrical surfaces. Disposed at one side of the backing plate 11, in this instance at the concave side, is an electrical resistance heating element 12. The heating element 12 may be of any suitable form but for best results is desirably of the form which includes a resistor 13 embedded in compacted granular refractory heat conducting electrical insulating material 14. The resistor is here shown as made in the form of a helically coiled wire, but may be of any other suitable form. The heating element 12 also desirably includes sheath means 15, of sheet metal, the sheath means 15 covering more or less of the outside surface of the refractory insulating material 14, as may be desired. In the instance shown, the sheath means 15 has a portion 16 covering the entire underside of the refractory insulating material 14, and also has portions 17, 18 bent around the longitudinal margins of the insulating material, and portions (not visible) in like manner bent around the longitudinal end margins of the insulating material, so that, as shown, the upper surface of the heating element 12 is free of any sheath means. The heating element 12 is also of oblong rectangular shape when viewed in plan and desirably approximately as long as the backing plate 11, and, like the backing plate, is so constructed that its cross-sectional form is generally arcuate, and of such arcuate radius that it may be disposed concentric with the backing plate 11. The heating element 12 is here shown as of less transverse width than the backing plate 11, and so disposed that one of its longitudinal margins approximately registers with one of the longitudinal margins, 19, of the backing plate 11.

Interposed between the backing plate 11 and the heating element 12 is a layer of heat insulating material 20 which is desirably made of a sheet of material comprising felted asbestos fibres, but may be made of any other suitable material.

The heating element 12 is here shown as including a plurality of terminals, here shown as two, 21, 22, having heads 23, 24 to which terminals the resistor 13 is connected. The heads 23, 24 are embedded in the refractory insulating material 14. The shanks of the terminals 21, 22 have threaded ends 25, 26, and the shanks extend in a generally radial outward direction through openings 27, 28 in the heat insulating layer 20, and through openings in electrically insulating bushings 29, 30 disposed in openings 31, 32 in the backing plate 11. Threaded onto the ends of the terminals 21, 22 are nuts 33, 34, each of which may be set up against a respective pair of metallic washers 35, 36, the upper one, 35, being smaller than the lower one, 36, and the lower one being insulated from the backing plate 11 by means of an insulating washer 37. The nuts 33, 34 need not be set up very tight against the washers 35, 36 for the reason that the terminals 21, 22 are not relied on to hold the heating element 12 to the backing plate 11, as will appear.

The heat-applying or ironing surface of the ironing shoe 10 is provided by the under face of a metallic member 38. The member 38 may be made of steel suitably plated, or it may be made of steel with a facing provided by a sheet of stainless steel, nickel, or any other metal especially adapted to ironing machine shoes and capable of receiving and retaining a highly polished smooth finish, or it may be made entirely of stainless steel or other non-corrodible alloy metal or other metal suitable for such service. The face member 38, whether made of plated metal, laminated metal, or entirely of suitable facing metal, may be made relatively thin. The face portion of the member 38 is here shown as defining a curve of ogee form, one part, 39, of which fits the portion 16 of the sheath means 15 of the heating element 12, and the other part, 40, of which extends from the left hand margin of the heating element 12 to and beyond the longitudinal margin 41 of the backing plate 11. The blank from which the face member 38 is made has its corners suitably cut away and is of sufficient size, so that a portion 42 of the face member 38 may be bent to form a rear wall for the heel of the shoe 10, the free upper marginal portion 43 of this rear wall 42 being clinched over the top face of the backing plate 11. The longitudinal free ends 44, 45 of the face member are similarly bent and clinched over the longitudinal ends of the backing plate 11 (see Figure 2). The free end of the toe portion of the face member 38 is made sufficiently long so that a portion, 46, thereof may be doubled back on the left hand end of the portion 40, and the free end of the portion 46 is so bent that it bears against the top surface of the backing plate 11. The bending of the face member, somewhat in box fashion, as hereinbefore described, has the effect of stiffening the construction.

Tedious clamping operations, as with screws and bolts, are avoided, since the parts need only be laid together and the margins of the face member crimped over the backing plate, as described, by means of a punch press.

It will now be apparent that further among the advantages of my invention is the elimination of any necessity for the fastening of clamping bolts to the face member 38, and as a result of that the member 38 may be made relatively thin. In the prior art much difficulty has been experienced in attempts to fasten clamping bolts to the face member of the shoe. When that was done the face member had to be thicker than was otherwise feasible or desirable, and even with a sufficiently thick face member to justify the fastening of clamping bolts by welding, the ironing or active face of the shoe usually became badly warped or buckled from the local heat of the welding operations. This risk is entirely obviated with my present invention.

It will be evident from the foregoing that the face member 38 serves various functions, among others; it provides a toe for the shoe 10; it provides the ironing surface of the shoe; it serves to hold itself and the backing plate mutually assembled; and, in cooperation with the backing plate, it serves to hold the heating element in assembled relation with the other parts.

It will be evident that the shoe 10 is adapted to cooperate with a drum or roll, of an ironing machine, indicated fragmentarily by the dot-and-dash line 100. When pressure is applied to the backing plate 11, this pressure is uniformly distributed through the layer 20, through the heating element 12, to that part of the face member 38 in contact with the roll 100. Obviously the face member 38 is kept in good contact with the heating element 12, and the face member is applicable, in good uniform contact with the roll 100. It will of course be evident that the shoe 10 may be of generally plane form, in which case it would be cooperable with a plane pressure receiving part instead of a roll 100.

Since with my invention an ironing machine shoe requires no heavy part between the ironing surface of the shoe and the heating element, but, on the contrary, only a thin face member 38, high speed heating, and more efficient utilization of heat is attained. The speed of heating is still further enhanced by the use of a heating element such as hereinbefore described. Moreover, heat distribution may be effectively controlled in any desired manner, by suitable distribution of the resistor 13. For example, the coils 13a in the leading or toe portion of the heating element 12, and the coils 13b in the trailing or heel portion of the element may be disposed closer to each other than the other coils of the resistor. Furthermore, coils may be omitted at one section of the heating element and included at another. For example, at the section shown in Figure 1 coils which would occupy the positions 13c are omitted, and this omission may extend from the center line 1—1 to a desired section line 101, here shown as halfway between the line 1—1, and the left hand end of the shoe. Between the line 101 and the left hand end of the shoe still more coils may be omitted, such for example as coils which would occupy the position 13d. On the other hand, between the line 1—1 and the right hand end of the shoe all coils may be included. It will be evident that, with this distribution of coils, the part of the shoe between the lines 1—1 and 101 will be flanked on the left and right by sections having respectively lower and higher general temperatures, with respectively lower and higher temperatures centrally of a cross-section from toe to heel of the shoe. This illustration is given merely by way of example of one desirable form of distribution.

It will of course be evident to those skilled in the art that the resistor may be divided into any desired number of parts with suitable terminals, for connection of the parts either in series or parallel, or in series parallel.

One way to provide for the mounting or supporting of the shoe is to provide the backing plate with threaded holes for cooperation with any suitable mounting means. Another way is to weld brackets to the backing plate. Other ways will readily suggest themselves.

The threaded holes 47, 48 are here shown as made in bosses 49, 50 pressed up from the metal of the backing plate 11. An illustrative mounting means cooperating with the threaded holes 47, 48, is shown in the drawings, in Figures 3 through 6. There are shown a pair of generally triangular brackets 51, 52, together forming a clevis mounting, each bracket, 51, 52, having a laterally enlarged portion 53 provided with an opening through which passes a threaded stud 54 into cooperative relation with the threads in the openings 47, 48 in the backing plate. The brackets are here shown as provided with openings 55 above the lateral enlargements 53, to provide for the application of a wrench to the heads of the studs 54. It will of course be evident that if desired the brackets 51, 52 may be welded to the backing plate, and that the bosses 49, 50 with their threaded openings 47, 48 may in such case be omitted. Welding of suitable brackets or other supporting means to the backing plate 11 is permissible in view of the relatively heavy character of the backing plate, and also in view of the manner in which my ironing machine shoe is constructed, whereby any warping due to welding will not affect the face member 38.

In order to raise and lower the shoe a shaft 56, extending through apertures 59 in the brackets 51, 52, may be provided, this shaft having reduced threaded ends 57, and being held in place by means of nuts 58 on the threaded ends. The shaft 56 extends through a pair of arms 60, 61, shown fragmentarily, and these arms may be used to raise and lower the shoe 10. It will be understood that the manner in which the shoe is supported and raised and lowered may be varied to suit the designs and needs of any particular ironing machine or the like.

The shoe 10 may be provided with a suitably enameled, or otherwise finished, metallic cover of any suitable form. In the instance illustrated, this cover comprises a main part 62, the longitudinal end walls 63, 64 of which have lower margins generally complementary to, and adapted to rest on the top of the shoe 10, the longitudinal margins 65, 66 being here shown as free of the shoe. The main part 62 of the cover has a generally rectangular opening 67, adjacent the margin of which the metal is depressed to form a channel 68 bounding the margin. In this channel, 68, rests the lower margin of an auxiliary cover 69, the top of which is here shown as immediately below the lower margins of the arms 60, 61.

The auxiliary cover 69 is provided with openings 70, 71 through which the brackets 51, 52 extend, and with a bushed opening through which a flexible cable 72 is adapted to pass. One of the conductors 73 of the cable is here shown as connected to one of the shoe terminals, 22, and fastened thereto by means of a nut 74. Another conductor 75, of the cable, is here shown (see Figure 4) as connected to an auxiliary terminal 76 not connected to the resistor. Interposed between the other terminal, 21, of the shoe is here shown a thermostat or thermostatic switch 77, having terminals 78, 79, one of which, 78, is connected by a conductor 80 to the terminal 21 of the shoe, and the other of which, 79, is connected by a conductor 75a to the auxiliary connection terminal 76. It will be obvious that the auxiliary connection terminal 76, as far as the electrical nature of the circuit is concerned, may be omitted. An operating handle 81 of the thermostatic switch 77 may be disposed at the outside of the cover 62 and the cover may have a downwardly extending local recess 82, to accommodate the boss of the operating handle. It will of course be apparent that if a thermostatic switch, such as 77, is provided, a suitable opening (not shown in Figure 2) will be provided in the backing plate 11, and in the insulating layer 20, so that the thermostat may be accommodated in these openings, desirably to reach to the inside surface of the face member 38, as shown in Figure 3. The thermostat will be desirably located in that part of the shoe having the highest temperature.

Referring now to Figure 7, the ironing machine shoe 10a here shown in cross-section, differs from the shoe 10 in that the heating element 12a is so constructed that the sheath 15a has its open side at the face member 38a. Thus the face member 38a contacts the refractory material 14a. The sheath 15a is provided with openings 83 through which the terminals 21a, 22a are freely disposed. Furthermore, the face member 38a, instead of being extended materially beyond the left hand longitudinal margin of the backing plate 11a, is bent immediately around that margin and clinched over the top of the backing plate so that the bight 84 of the bend comes at that longitudinal margin. Otherwise the shoe 10a may be constructed in the same manner as the shoe 10.

It will be apparent that my invention provides an ironing machine shoe which though light in weight is very durable. At the same time it is simply constructed, requiring few parts, which are readily and inexpensively assembled. Other features and advantages have either already been pointed out or will be apparent to those skilled in the art.

From the foregoing description it will be apparent to those skilled in the art that each of the illustrated embodiments of my invention provides a new and improved electric heating apparatus, and accordingly, each accomplishes the principal object of my invention. On the other hand, it also will be obvious to those skilled in the art that the illustrated embodiments of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. A heat-applying machine shoe, comprising: a sheet metal member having a face providing the heat and pressure applying surface of said shoe, said sheet metal member being so constructed and arranged as to be by itself incapable of withstanding deformation by normal pressure applied to said heat and pressure applying surface; a heating unit, including a resistor embedded in a compact mass of refractory electrical insulating material, so constructed and arranged that said unit heats said member and resists deformation of said member by normal pressure applied to said heat and pressure applying surface; and means, including an integral portion of said member, constructed and arranged to hold said heating means in assembled relation with said member.

2. A heat-applying machine shoe, comprising: a sheet metal member having a face providing the heat and pressure applying surface of said shoe; said member being constructed from non-corrodible metal and being by itself incapable of withstanding deformation by normal pressure applied to said heat and pressure applying surface; and means for sustaining said member against such deformation, said means including heating means comprising a resistor embedded in a compact mass of refractory electrical insulating material and being so constructed and arranged that such deformation is resisted by said heating means.

3. A heat-applying machine shoe, comprising: a sheet metal member having a face providing the heat and pressure applying surface of said shoe; a relatively heavy metal plate disposed at the side of said sheet metal member opposite from said heat and pressure applying surface; a heating unit, including a resistor embedded in a compact mass of refractory electrical insulating material, disposed between said sheet metal member and said plate, said heating unit being so constructed and arranged that it heats said sheet metal member and sustains said sheet metal member against deformation by normal pressure applied to said heat and pressure applying surface; and means for holding assembled with each other said sheet metal member and said plate and said heating unit.

4. A heat-applying machine shoe, comprising: a metal plate member; a heating unit positioned at one side of said plate member; a metallic member, providing the heat and pressure applying surface of said shoe, disposed against said heating unit and so constructed and arranged that pressure applied against said surface is transmitted therethrough to said heating unit; holding means whereby said metallic member holds said heating unit in said position; and auxiliary holding means, including electric terminals carried by said heating unit, constructed and arranged to hold said heating unit in said position independently of said metallic member prior to application of said metallic member.

5. A heat-applying machine shoe, comprising: a metal plate member; a heating unit positioned at one side of said plate member; a sheet metal member, providing the heat and pressure applying surface of said shoe, disposed against said heating unit and so constructed and arranged that pressure applied against said surface is transmitted therethrough to said heating unit; holding means, including an integral portion of said sheet metal member bent around said plate member, so constructed and arranged that said heating unit is held in said position; and auxiliary holding means for holding said heating unit in said position independently of said sheet metal member prior to application of said sheet metal member.

6. A heat-applying machine shoe, comprising: a metal plate member; a heating unit positioned at one side of said plate member; a sheet metal member, providing the heat and pressure applying surface of said shoe, disposed against said heating unit and so constructed and arranged that pressure applied against said surface is transmitted therethrough to said heating unit; holding means, including an integral portion of said sheet metal member bent around said plate member, so constructed and arranged that said heating unit is held in said position; and auxiliary holding means, including at least one stud carried by said heating unit, constructed and arranged to hold said heating unit in said position independently of said sheet metal member prior to application of said sheet metal member.

7. A heat-applying machine shoe, comprising: a metal member having a face providing the heat-applying surface of said shoe; means for heating said member, said heating means including a separate unit comprising an electrical resistor embedded in a compact mass of granular refractory electrical insulating heat conducting material; and means, including an integral portion of said member, bent around said heating means, so constructed and arranged that said heating means is held in assembled relation with said member.

8. A heat-applying machine shoe, comprising: a metal member having a face providing the heat-applying surface of said shoe; means for heating said member, said heating means including a unit comprising an electrical resistor embedded in compacted granular refractory electrical insulating heat conducting material and a metallic cover, forming a part of said heating unit, for at least a portion of the surface of said insulating material; and means, including an integral portion of said member bent around said heating means, so constructed and arranged that said heating means is held in assembled relation with said member.

9. A heat-applying machine shoe, comprising: a sheet metal member having a face providing the heat-applying surface of said shoe, said sheet metal member being made from non-corrodible metal; means for heating said member, said heating means including a separate unit comprising an electrical resistor embedded in a compact mass of granular refractory electrical insulating heat conducting material; and means, including an integral portion of said member bent around said heating means, so constructed and arranged that said heating means is held in assembled relation with said member.

10. A heat-applying machine shoe, comprising: a sheet metal member having a face providing the heat and pressure applying surface of said shoe, said sheet metal member being by itself incapable of withstanding deformation by normal pressure applied to said heat and pressure applying surface; a relatively heavy metal plate disposed at the side of said sheet metal member opposite from said heat and pressure applying surface; a heating unit disposed between said sheet metal member and plate, said heating unit being so constructed and arranged that it heats said sheet metal member and sustains said sheet metal member against deformation by normal pressure applied to said heat and pressure applying surface; and means for holding assembled with each other said sheet metal members and said plate and said heating unit.

11. A heat-applying machine shoe, comprising: a metal plate member; a heating unit positioned at one side of said plate member; a metallic member, providing the heat and pressure applying surface of said shoe, disposed against said heating unit and so constructed and arranged that pressure applied against said surface is transmitted therethrough to said heating unit; holding means whereby said metallic member holds said heating unit in said position; and auxiliary holding means so constructed and arranged that it holds said heating unit in said position independently of said metallic member prior to application of said metallic member.

12. A heat-applying machine shoe, comprising: a metal plate member having at least one aperture; a heating unit positioned at one side of said plate member; holding means for holding said heating unit in said position, said holding means including at least one stud carried by said heating unit and disposed through an aperture in said plate member; a metallic member, providing the heat-applying surface of said shoe, disposed against said heating unit; and means fastening said metallic member to said plate member.

13. A heat-applying machine shoe, comprising: a sheet metal member having a face providing the heat and pressure applying surface of said shoe, said member being so constructed and arranged as to be by itself incapable of withstanding deformation by normal pressure applied to said heat applying surface; a separate heating unit having a surface of predetermined fixed form disposed at the side of said sheet metal member opposite from said heat and pressure applying surface, said heating unit being so constructed and arranged that when said sheet metal member and said heating unit are pressed toward each other said surface of said heating unit determines the form of said heat and pressure applying surface.

14. A heat-applying machine shoe, comprising: a sheet metal member having a face providing the heat and pressure applying surface of said shoe, said member being so constructed and arranged as to be by itself incapable of withstanding deformation by normal pressure applied to said heat applying surface; a separate heating unit having a surface of predetermined fixed form disposed at the side of said sheet metal member opposite from said heat and pressure applying surface, said heating unit including a resistor embedded in a compact mass of refractory electrical insulating material and being so constructed and arranged that when said sheet metal member and said heating unit are pressed toward each other said surface of said heating unit determines the form of said heat and pressure applying surface.

15. A heat-applying machine shoe, comprising: a sheet metal member having a face providing the heat and pressure applying surface of said shoe, said member being so constructed and arranged as to be by itself incapable of withstanding deformation by normal pressure applied to said heat applying surface; a separate heating unit having a surface of predetermined fixed form disposed at the side of said sheet metal member opposite from said heat and pressure applying surface, said heating unit being so constructed and arranged that when said sheet metal member and said heating unit are pressed toward each other said surface of said heating unit determines the form of said heat and pressure applying surface; and means, including an integral portion of said sheet metal member, so constructed and arranged that said heating unit and said member are held in assembled relation.

16. A heat-applying machine shoe, comprising: a metal plate member; a heating unit positioned at one side of said plate member; a metallic member, providing the heat and pressure applying surface of said shoe, disposed against said heating unit and so constructed and arranged that pressure applied against said surface is transmitted therethrough to said heating unit; holding means whereby said metallic member holds said heating unit in said position; and auxiliary holding means, including a portion carried by said heating unit, so constructed and arranged that said heating unit is held in said position independently of said metallic member prior to application of said metallic member.

17. A heat-applying machine shoe, comprising: a metal plate member having at least one aperture; a heating unit positioned at one side of said plate member; holding means so constructed and arranged that it holds said heating unit in said position, said holding means including at least one threaded stud carried by said heating unit and disposed through an aperture in said plate member, and a nut on said threaded stud; a metallic member, providing the heat-applying surface of said shoe, disposed against said heating unit; and means fastening said metallic member to said plate member.

18. A heat-applying machine shoe, comprising: a sheet metal member having a face providing the heat and pressure applying surface of said shoe; a relatively heavy metal plate disposed at the side of said sheet metal member opposite from said heat and pressure applying surface; a heating unit, including a resistor embedded in a compact mass of refractory electrical insulating material, disposed between said sheet metal member and said plate, said heating unit being so constructed and arranged that it heats said sheet metal member and sustains said sheet metal member against deformation by normal pressure applied to said heat and pressure applying surface; and means, including an integral portion of said sheet metal member, so constructed and arranged that said sheet metal member and said plate and said heating unit are held assembled with each other.

19. A heat-applying machine shoe, comprising: a metal plate member; a heating unit positioned at one side of said plate member; a metallic member, providing the heat and pressure applying surface of said shoe, disposed against said heating unit and so constructed and arranged that pressure applied against said surface is transmitted therethrough to said heating unit; holding means whereby said metallic member holds said heating unit in said position; and auxiliary holding means, including at least one stud carried by said heating unit, constructed and arranged to hold said heating unit in said position independently of said metallic member prior to application of said metallic member.

EDWIN L. WIEGAND.